Feb. 23, 1965
H. A. JOHNSON
3,170,715
TRACTOR TANDEM COUPLING
Filed Oct. 23, 1962
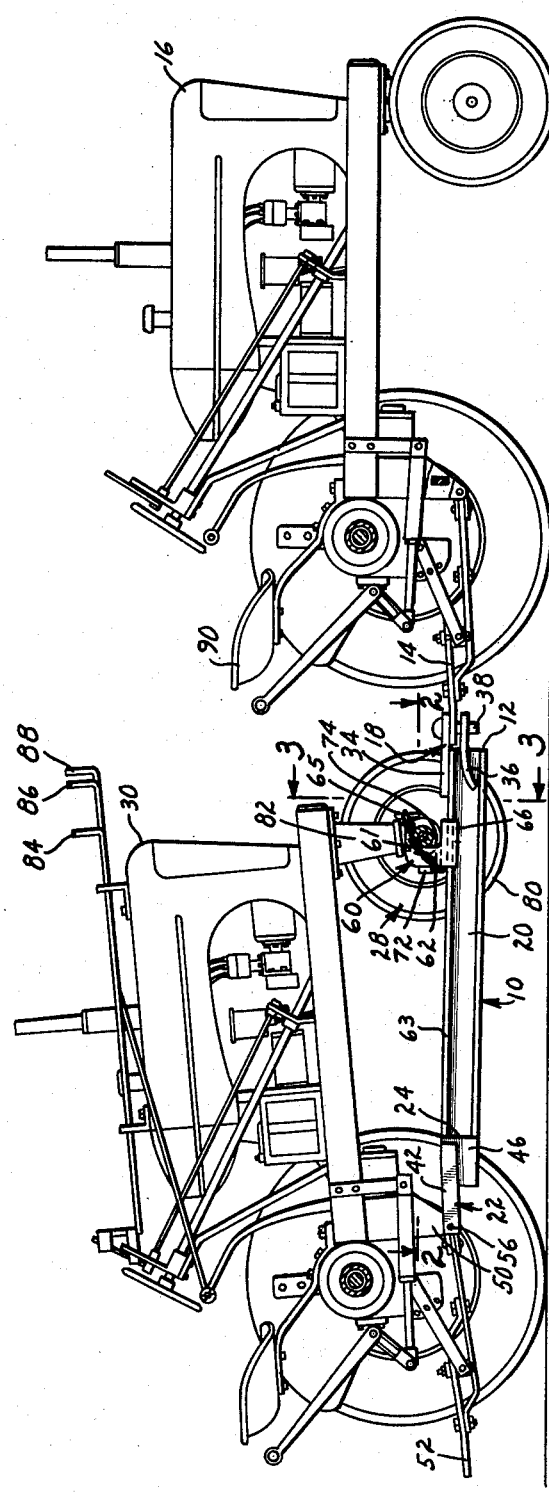
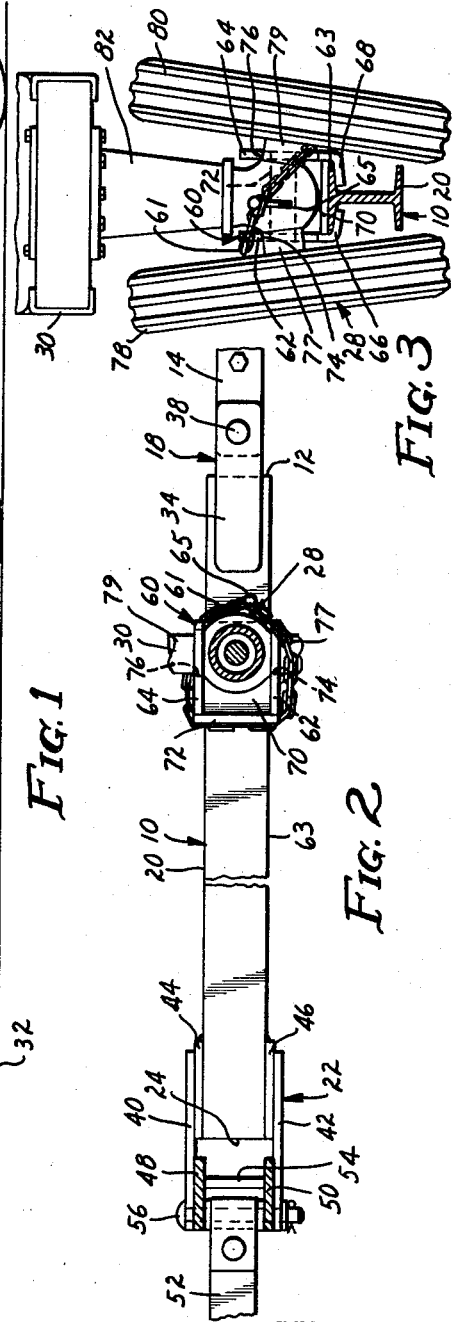
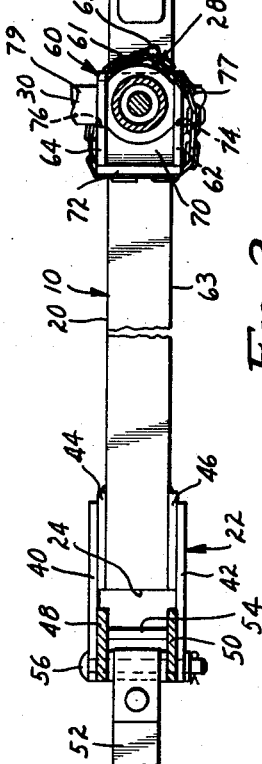
INVENTOR.
HARVEY A. JOHNSON
BY
Merchant, Merchant & Gould
ATTORNEYS

United States Patent Office 3,170,715
Patented Feb. 23, 1965

3,170,715
TRACTOR TANDEM COUPLING
Harvey A. Johnson, Rte. 1, Glenwood, Minn.
Filed Oct. 23, 1962, Ser. No. 232,496
3 Claims. (Cl. 280—402)

This invention relates to improvements in tractor tandem couplings.

More particularly, this invention relates to a new and very useful apparatus for coupling together a pair of tractors in tandem, preferably for common operation by a single operator.

In accordance with the invention, a special towbar element supports, above the ground, the front end of the second or slave vehicle from the rear end of the first or master vehicle and at the same time permits the pulling force exertable by the master tractor to be directly transmitted to the load (which is usually some sort of farm machinery) positioned rearwardly of the slave tractor.

In preferred form, the present invention comprises a tractor coupling for coupling together a pair of tractors in tandem relationship, the second of said tractors having a pair of axially spaced front wheels, each wheel being mounted in a normally aligned side-by-side relationship to the other, said coupling comprising an elongated towbar extending between the front wheels of the second of said pair of tractors, a first hitching means at the rear end of said towbar for connecting said rear end to the drawbar of said second tractor and adapted to permit vertical oscillatory movements of said towbar about said first coupling means when said first coupling means is connected to the drawbar of said second tractor, a second hitching means mounted at the front end of said towbar for connecting said front end to the drawbar of the first of said pair of tractors, said hitching means being adapted to permit horizontal oscillatory movements of said towbar about said second coupling means when the same is connected to the drawbar of said first tractor, and a U-shaped saddle whose base longitudinally slidably engages said towbar and whose sides are adapted to hold the axle housing of each respective front wheel of the pair of front wheels of said second tractor in spaced relation to the ground.

It is an object of this invention to provide a simple, readily installable apparatus for coupling two tractors together in tandem for using the pulling or drawing power of both tractors against a load positioned rearwardly of both tractors.

It is another object of this invention to provide a tractor tandem coupling which can be used with virtually any two tractors to couple them in tandem.

It is another object of this invention to provide a coupling apparatus for connecting a pair of tractors together in tandem having hitching means at opposite ends of a towbar, each adapted to permit connection of such towbar to the respective drawbars of each member tractor of the pair.

It is another object of this invention to provide for the towbar of a tractor coupling in which the following or slave tractor has its front wheels supported in spaced relation to the ground by means of a saddle longitudinally slidably mounted on said towbar.

Other and further objects of this invention will become apparent to those skilled in the art from a reading of the present specification taken together with the drawings, in which:

FIG. 1 is a side elevational view of a pair of tractors coupled in tandem using an embodiment of the tractor tandem coupling of this invention, some parts thereof being broken away and some parts shown in section;

FIG. 2 is a horizontal sectional view taken along the line 2—2 of FIG. 1, some parts thereof being broken away; and FIG. 3 is a vertical section taken along the line 3—3 of FIG. 1, some parts thereof being broken away.

Shown in FIG. 1 is a tractor tandem coupling of the invention herein designated in its entirety by the numeral 10. Coupling 10 is composed of a towbar 20, herein shown in the form of an I-beam, having hitching means 18 and 22 secured to its respective front end 12 and rear end 24. A saddle 60 is provided on towbar 20 for supporting the front wheel structure 28 of the following or slave tractor 30 in spaced relation to the ground 32.

The front end 12 of coupling 10 is connected to the drawbar 14 if master or lead tractor 16 by hitching means 18. Hitching means 18 is formed by a pair of horizontally-positioned, forwardly-extending leaves 34 and 36 which are so positioned as to be in spaced, parallel relation to one another beyond the front end 12 of towbar 20. Aligned apertures extending through such leaves 34 and 36 are provided to slip a pin 38 through, thereby to catch and hold drawbar 14 between leaves 34 and 36.

The rear end 24 of towbar 20 has a pair of vertically-positioned, rearwardly-extending leaves 40 and 42 which are so positioned as to be in spaced relation to one another beyond the rear end 24 of towbar 20. Spacer elements 44 and 46 positioned between leaves 40 and 42, respectively, in the region where leaves join towbar 20 are provided in order to provide a greater space between the open or extended ends of the leaves 40 and 42 and in order to provide a base for attaching leaves 40 and 42 to the sides of the I-beam constituting towbar 20. The space between the ends of leaves 40 and 42 is such as to permit the downwardly-depending arms 48 and 50 (paired) forming the root or base on the tractor to which drawbar 52 of tractor 30 is fastened. The arms 48 and 50 are held in fixed, parallel relation to one another and are braced together by strut 54 which is mounted crosswise between arms 48 and 50. Then, the same pin 56 which extends through a pair of aligned holes in the depending ends of arms 48 and 50 to attach drawbar 52 to arms 48 and 50 is employed to engage the leaves 40 and 42 with arms 48 and 50, respectively, in the manner shown in FIGURE 2. Hence, the pulling force exerted by tractor 16 is directly transmitted through towbar 20 to drawbar 52, which linkages might readily cause undesired stresses and strains to be set up in the frame or other portions of tractor 30. It will be appreciated, of course, that the particular method of joining the tractor tandem coupling 10 to the drawbar 52 of tractor 30 will vary necessarily from tractor to tractor owing to the differing manners in which drawbars are attached to a tractor.

It is a feature of the present invention, however, that the tractor tandem coupling 10 be directly connected to the slave tractor 30 at the point where the drawbar 52 of the tractor 30 is connected to such tractor 30 so as to directly transmit the pulling force of the master tractor 16 to the drawbar 52 of the slave tractor 30. It is drawbar 52, of course, which connects the load to be pulled by the pair of tractors in tandem. Usually, connection of a towbar 20 to a slave tractor 30 is accomplished by using a bifurcated or forked hitching head 22 mounted on the rear end 24 of tractor tandem coupling 10.

As mentioned above, to support the front wheel structure in spaced relation to the ground, there is provided a saddle 60 which is constructed so as to slidably engage towbar 20. In the embodiment shown, saddle 60 is composed of a pair of plates 62 and 64, each having its bottom end inturned so as to form respective flanges 66 and 68. Between a corresponding position along the bottom adjacent inside wall of each plate 62 and 64 is secured a slide brace 70 so positioned as to permit the top across member of the I-beam constituting towbar 20 to fit between the bottom of slide brace 70 and the respective top faces of flanges 66 and 68. To further fix the spaced, parallel relationship desired between plates 62 and 64, a cross brace 72 is mounted across the trailing vertical sides of plates 62 and 64. In the lead edge of each plate 62 and 64 is cut a rectangularly-shaped slot 74 and 76, respectively, such slots being aligned with one another horizontally. The height and depth of each such slot 74 and 76 exceeds the diameter of the axle 77 and 79 associated with each respective front wheel 78 and 80 of slave tractor 30. The distance between plates 62 and 64 exceeds the width of the column and supporting mechanism 82 associated with wheels 78 and 80 of slave tractor 30 in the region where axle 77 and 79 join the column and supporting mechanism 82. Conveniently, the paired cross members of the I-beam constituting towbar 20 have respective widths great enough to permit selection of flanges 66 and 68 and slide brace 70 of such respective dimensions that saddle 60 can securely engage the I-beam constituting towbar 20 and still have generally, parallelly disposed plates 62 and 64.

In order to secure the saddle 60 to the towbar 20 a chain 61, or other flexible, non-elastic, cord-like member, is wrapped around saddle 60 and supporting mechanism 82, chain 61 passing over axle 77 and under axle 79, or vice versa. Chain 61 fixes the relationship between saddle 60, supporting mechanism 82 and towbar 20 yet permits a slight amount of movement by saddle 60 when master tractor 16 is drawing slave tractor 30. Such slight movement of saddle 60 is desirable, particularly when spring tension drawbars are involved. The ends of chain 61 are secured together by a pin 65. Chain 61 and pin 65 prevent excessive forward and backward sliding movements of saddle 60 along flange 63. Thus, wheels 78 and 80 of the slave tractor 30 are located in spaced relation to the ground. Any convenient means for holding saddle 60, supporting mechanism 82, and towbar 20 in the desired relationship to one another can be employed depending upon the particular type of tractors involved, convenience, etc.

While in the embodiment shown, the towbar 20 is being used to couple together in tandem a pair of tractors, the second one of which has a pair of front wheels which are axially spaced from one another, it will be appreciated that the tandem tractor coupling of this invention can also be adapted for use with tractors having a single front wheel, as by slightly modifying the front end portion of towbar 20. Similarly, the tractor tandem coupling of this invention can be used with slave tractors having a pair of front wheels which are relatively widely axially spaced from one another and with tractors which have independent front wheel suspension means.

One convenient procedure which can be employed to connect two tractors in tandem using the tractor tandem coupling 10 of this invention is briefly as follows. Connect hitching head 22 to the crossbar mountings of the slave tractor. With towbar 20 extending between the front wheels 78 and 80 of slave tractor 30, with the saddle 60 positioned behind the front wheel assembly 28, raise towbar 20 between the front wheels 78 and 80 and slide forward saddle 60 so as to engage slots 74 and 76 with respective front axle 77 and 79. Next, front end 12 of towbar 20 is jacked up and connected by the hitching means 18 to drawbar 14 of master tractor 16. Finally, chain 61 is wrapped around saddle 60 and supporting mechanism 82.

In order to permit common operation of both master and slave tractors by a single operator seated upon a seat 90 of master tractor 16, there is provided means for selectively controlling differentially the control elements of the rear tractor. Any convenient means can be employed to so remotely operate controls of slave tractor 30 from the driver's seat 90 of master tractor 16. In the embodiment shown, such control is achieved by means of extension rods 84, 86 and 88 which are employed to control clutch, throttle and hydraulic hoist of slave tractor 30.

While I have shown and described a commercial embodiment of my tractor tandem coupling, and certain modifications thereof, it will be understood that the same is capable of further modification and that all such modifications may be and are made without departures from the spirit and scope of my invention, as defined in the claims.

The claims are:
1. A tractor coupling for coupling together a pair of tractors in tandem relationship, said coupling comprising
 (a) a towbar,
 (b) a first hitching means at one end of said towbar adapted to permit vertical oscillatory movements of said towbar,
 (c) a second hitching means connected at the other end of said towbar adapted for horizontal oscillatory movements of said towbar,
 (d) a saddle having a base longitudinally slidably mounted on said tow bar,
 (e) a pair of laterally spaced upstanding ears formed on said base,
 (f) each of said ears defining a forwardly opening recess adapted to engage the front axle of the rear one of said tractors and to support the front wheel structure thereof in spaced relation to the ground, and
 (g) means limiting forward movement of said front axle relative to said saddle.

2. A tractor coupling for coupling together a pair of tractors in tandem relationship, the second of said tractors having a pair of axially spaced front wheels, each wheel being mounted in a normally aligned side-by-side relationship to the other, said coupling comprising
 (a) an elongated towbar extending between the front wheels of the second of said pair of tractors,
 (b) a first hitching means at the rear ends of said towbar for connecting said rear end to the drawbar of said second tractor and adapted to permit vertical oscillatory movements of said towbar about said first coupling means when said first coupling means is connected to the drawbar of said second tractor,
 (c) a second hitching means mounted at the front end of said towbar for connecting said front end to the drawbar of the first of said pair of tractors, said hitching means being adapted to permit horizontal oscillatory movements of said towbar about said second coupling means when the same is connected to the drawbar of said first tractor,
 (d) a saddle having a base longitudinally slidably mounted on said towbar,
 (e) a pair of laterally spaced ears formed on said base,
 (f) each of said ears defining a forwardly opening recess adapted to engage the front axle of the rear one of said tractors and to support the front wheel structure thereof in spaced relation to the ground, and
 (g) means limiting forward movement of said front axle relative to said saddle.

3. The tractor coupling of claim 2 wherein said means limiting forward movement comprises a flexible non-elastic cord-like member wrapped around said saddle and said axle housing of each respective front wheel of the pair of front wheels of said second tractor.

References Cited by the Examiner

UNITED STATES PATENTS

| | | | |
|---|---|---|---|
| 1,860,518 | 5/32 | Wells | 280—402 |
| 1,864,781 | 6/32 | Wells | 280—402 |
| 2,183,478 | 12/39 | Holmes et al. | 214—86 |
| 2,661,856 | 12/53 | Stanley et al. | 214—86 |
| 2,727,581 | 12/55 | Wright | 180—14 X |
| 2,849,073 | 8/58 | Gaspardo | 280—402 X |
| 2,962,300 | 11/60 | Garman | 280—402 X |

A. HARRY LEVY, *Primary Examiner.*

LEO FRIAGLIA, *Examiner.*